United States Patent
Colley et al.

[11] 3,726,066
[45] Apr. 10, 1973

[54] DUST COLLECTOR

[75] Inventors: Donald G. Colley, Huxley, Alberta, Canada; Raymond M. Leliaert, South Bend; Clyde A. Snyder, Mishawaka, both of Ind.

[73] Assignee: Wheelabrator Frye Inc., New York, N.Y.

[22] Filed: Dec. 14, 1970

[21] Appl. No.: 98,199

Related U.S. Application Data

[63] Continuation of Ser. No. 849,443, Aug. 12, 1972, abandoned.

[52] U.S. Cl. ............................................55/302, 55/341
[51] Int. Cl. ...................................................B01d 46/04
[58] Field of Search ....................55/302, 303, 341; 210/233

[56] References Cited

UNITED STATES PATENTS

| | | | |
|---|---|---|---|
| 2,072,906 | 3/1937 | Rosenberger | 55/341 |
| 2,414,564 | 1/1947 | Silverman | 55/341 |
| 2,848,112 | 8/1958 | Hass | 210/333 |
| 3,204,390 | 9/1965 | Heyl | 55/341 |
| 3,421,295 | 1/1969 | Swift | 55/341 |
| 3,436,899 | 4/1969 | Pausch | 55/341 |
| 3,535,852 | 10/1970 | Hirs | 55/341 |
| 3,541,631 | 11/1970 | Kluge et al. | 55/341 |
| 3,541,764 | 11/1970 | Astrom | 55/341 |
| 3,606,736 | 9/1971 | Leliaevt et al. | 55/341 |

FOREIGN PATENTS OR APPLICATIONS

| | | | |
|---|---|---|---|
| 225,059 | 10/1959 | Australia | 55/302 |
| 248,453 | 12/1963 | Australia | 55/302 |

*Primary Examiner*—Bernard Nozick
*Attorney*—McDougall, Hersh & Scott

[57] ABSTRACT

Apparatus for removal of solids from gaseous medium by the use of a filter surface in the form of filter tubes from which the filter cake is removed by a reverse burst of high pressure gas without stopping filter flow and in which the gaseous medium with suspended solids is baffled for introduction into the filter section in a manner not to interfere with the disposal of the removed filter cake and to enhance solids separation.

5 Claims, 12 Drawing Figures

Fig. 10
V = Air to Cloth Ratio
DUST COLLECTOR (AIR INLET NEAR BOTTOM)

Fig. 11
DUST COLLECTOR (BAFFLE WITH INLET NEAR TOP)

Fig. 12
ANOTHER DUST COLLECTOR (AIR INLET NEAR BOTTOM)

DUST COLLECTOR

This application is a continuation of Ser. No. 849,443 filed Aug. 12, 1969 now abandoned.

This invention relates to the treatment of gases and vapors for the removal of solids suspended therein. It relates more particularly to a method and apparatus for filtering air on gaseous medium for the removal of dust, dirt and the like solid particles suspended therein.

With reference to the well known processes of filtration wherein use is made of one and preferably a plurality of porous filter tubes or bags through which the gaseous medium to be filtered is passed from an ingoing side to the opposite outgoing side, the solids separated from the gaseous medium build up on the walls of the ingoing side of the tube to form a filter cake. As the filter cake builds up in thickness, the pressure drop across the filter medium increases whereupon it ultimately becomes necessary to effect removal of the filter cake or a greater portion thereof for most efficient operation.

In the past, this has been accomplished in a number of ways. One simple technique has been to make use of a shaking device from which the filter bags or tubes are suspended and operated periodically to shake the bags to loosen the filter cake collected on the surfaces thereof. The dislodged dust or dirt falls gravitationally through the filter chamber to a collecting chamber at the bottom from which it is removed. In order to permit the solids dislodged from the surfaces of the filter tubes to fall gravitationally to the collector at the bottom, it has been necessary to stop filter flow of the dust laden gases, at least in the sections or compartments in which the bags are being cleaned.

In the attempt to achieve more effective removal of the solids entrapped within the walls or pores of the filter bag while dislodging solids forming the filter cake, use has also been made of a process identified as a "back washing" technique wherein the flow of gaseous medium is reversed for flow back through the filter surface from the outgoing side to the ingoing side. This back washing operation is intended to dislodge the filter cake and blow the collected solids from within the pores of the filter surface with corresponding reduction in pressure drop across the filter medium. Again, the back washing process requires that the normal filter flow be terminated in a section or compartment during the backwashing operation whereby numerous valves and controls are required for regulating gaseous flow and for proper sequencing of the various operations.

More recently, as described in the Church Pat. No. Re. 24,954, the need for stopping filter flow in isolated compartments during filter cake removal has been eliminated by the intermittent use of a jet of gas across the open mouths of each of the outgoing sides of a portion of the filter elements in which the jet of gas is applied at a pressure substantially greater than that of the stream of gas to be filtered. As a result, a counterflow is established which generates a sweeping action distending and snapping the filter element to dislodge the filter cake and clean the pores of the filter element to the extent that pressure drop across the filter surface is markedly reduced. The described removal of solids collected on the filter surface can be effected without interruption of the total filter flow although part of the flow of the filtering gas is temporarily reversed by the jet action. Thus, the described solids removal is generated without the need for the compartmentation, piping and valving systems characteristic of the back washing or shaking operation since the need is only for intermittent release of the burst of high pressure gas.

As in the other systems, the solids dislodged from the filter surface fall gravitationally to a collecting section from which the solids are removed.

The described filtration system is still subject to a number of deficiencies, such as the use of an excessive amount of high pressure gas, exacting control of distance and dimensions of the various parts for the generation of an effective jet stream, and a characteristic of the system is in the operation at relatively high pressure differentials with corresponding high filter drag, which is a measure of efficiency of operation.

Another deficiency which is characteristic of filter systems of the type described, wherein filter flow is continued during removal of the filter cake, is the tendency for dislodged solids to become re-entrained into the gaseous medium to be filtered for re-suspension therein, thereby to increase the load on the filter and markedly to reduce the efficiency and/or effectiveness of the filter system.

It is an object of this invention to provide a method and apparatus which represents a marked improvement in the jet principle for removal of solids collected on the surfaces of filter elements with considerable savings in pressurized gas with less filter drag, and it is a related object to provide a filtering system of the type described which operates at lower levels of pressure drop across the filter surface and with improved operating efficiency.

Another object is to provide a method and means in a filter system, which makes use of continuous filter flow, in which the gas to be filtered is introduced in a manner which does not interfere with the settling by gravity of the solids removed from the filter surface; in which the gas to be filtered is introduced into the filter system in a manner to assist in the settling of solids removed from the filter surface; in which the gas to be filtered is introduced in a manner to effect removal of suspended solids even before engagement with the filter surface; and in which the gas to be filtered is introduced in a manner to provide a more uniform distribution in the filter section whereby more effective use is made of the entire filter area that is available.

These and other objects and advantages of this invention will hereinafter appear and, for purposes of illustration, but not of limitation, embodiments of the invention are shown in the accompanying drawings, in which.

Description will first be made of a method and apparatus which makes use of a sudden burst of high pressure gas to dislodge solids collected as a filter cake on the surface of the filter tube. Thereafter description will be made of an important feature of this invention for introduction of the gas to be filtered in a manner which will not interfere with the particles dislodged from the filter cake while continuing filter flow. While the latter concept will be described with reference to the first concept for dislodgment of the filter cake to effect removal without interrupting filter flow, it will be understood that the latter concept has utility in any gas filter system herein introduction of the gas to be filtered is maintained even during filter cake removal.

Figure 1:
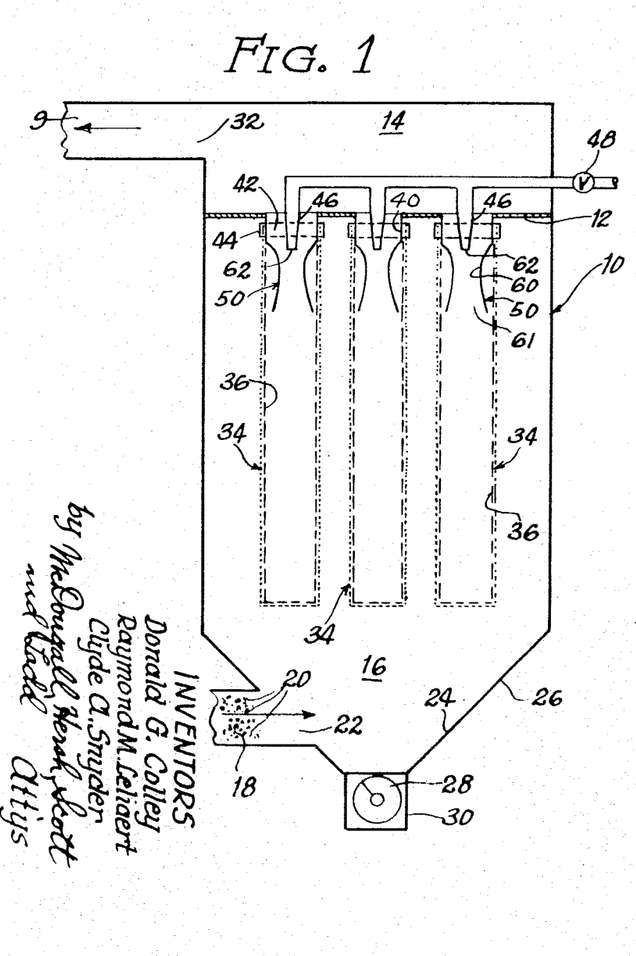
FIG. 1 is a schematic sectional elevational view of a filtering apparatus embodying a feature of this invention with the open end of the filter element(s) at the top.

As illustrated in FIG. 1, the filter apparatus comprises an enclosed filter housing 10 subdivided by a horizontally disposed cell plate 12 into an upper clean gas plenum chamber 14 and a lower inlet plenum chamber 16 into which the gaseous material 18, to be processed for removal of suspended solids 20, is introduced through an inlet opening 22 in communication with the inlet plenum chamber 16.

The lower end portion of the inlet plenum chamber is formed with convergent walls 24 to define a hopper 26 for collection of the solid particles which fall gravitationally when removed from the filter element surfaces. A screw conveyor 28 operates in the trough 30 in the bottom of the hopper 26 for displacement of collected solids from the apparatus. Other means, such as a rotary air lock, may be used for removal of collected solids.

An outlet opening 32 communicates the clean gas plenum chamber 14 with the exhaust 9 of clean air into the atmosphere or the exhaust of clean gas as a process or reprocessing gas.

Suspended into the inlet plenum chamber 16 are one or more vertically disposed filter elements 34 in the form of elongate porous members, such as stockings or bags preferably formed of felted fabrics of such fibers as cotton, silk, hemp or other natural fibers, or glass, asbestos or the like inorganic fibers, or fibers marketed under the names Orlon, Dacron, or the like man-made fibers, or combinations thereof, or woven fabrics of such fibers as cotton, silk, hemp or other natural fibers, or man-made fibers, or glass, asbestos or the like organic fibers or combinations thereof, but it is further preferred to fabricate the filter tube of fibrous fabrics characterized by good wear resistance, good chemical resistance and of fibers which are resistant to high temperatures to enable use in the treatment of gases exhausted at high temperature from such chemical operations as cement plants, aluminum plants, etc. The tubular filter member is closed at its lower end and is usually retained in its tubular shape by means of a suitable internal support, such as an open tubular frame 36 formed of wire screening or the like rigid, highly foraminous material.

Each filter tube (bag) is removably suspended from the cell plate 12 by a tubular section 40 fixed to one side of the cell plate 12 in communication with an opening 42 through the cell plate. The tubular member is dimensioned to receive the upper open end portion of the filter tube 34 in telescoping relationship thereabout and it is secured in the assembled relation about the tubular section, as by means of a clamp 44.

Extending downwardly into the opening beyond the upper end of the filter tube is a source of primary gas in the form of a nozzle 46 with orifice 62 having diameters, such as one-eighth inch to 1 inch in diameter, and connected at its upper end to a source of supply of high pressure primary gas, with suitable valve means 48 and controls for regulating the frequency and duration of burst of the high pressure primary gas to the nozzle 46.

Concentrically arranged about the nozzle 46 is a nozzle or venturi section 50 to provide an annular space between the nozzle 46 and the nozzle or venturi section 50 which is open at its upper end for the flow therethrough of secondary gas.

The nozzle or venturi section 50 is provided at its lower end with a diverging section 61 axially aligned with the nozzle 46 but with the passage through the throat 60 being of larger dimension than the orifice 62 and spaced therefrom by an amount to enable the spreading cone of the jet of primary gas from the orifice 62 to flow in close proximity to the interior wall of the nozzle or venturi throat at 60 to generate a pumping action as the burst of gas issues from the orifice 62 for passage through the aligned nozzle or venturi section. Thus the secondary gas is drawn through the annular space for addition to the primary gas passing through the throat 60 to generate a burst of gas having greater force and effect for issuance from the end of the nozzle or venturi section.

Figure 2:
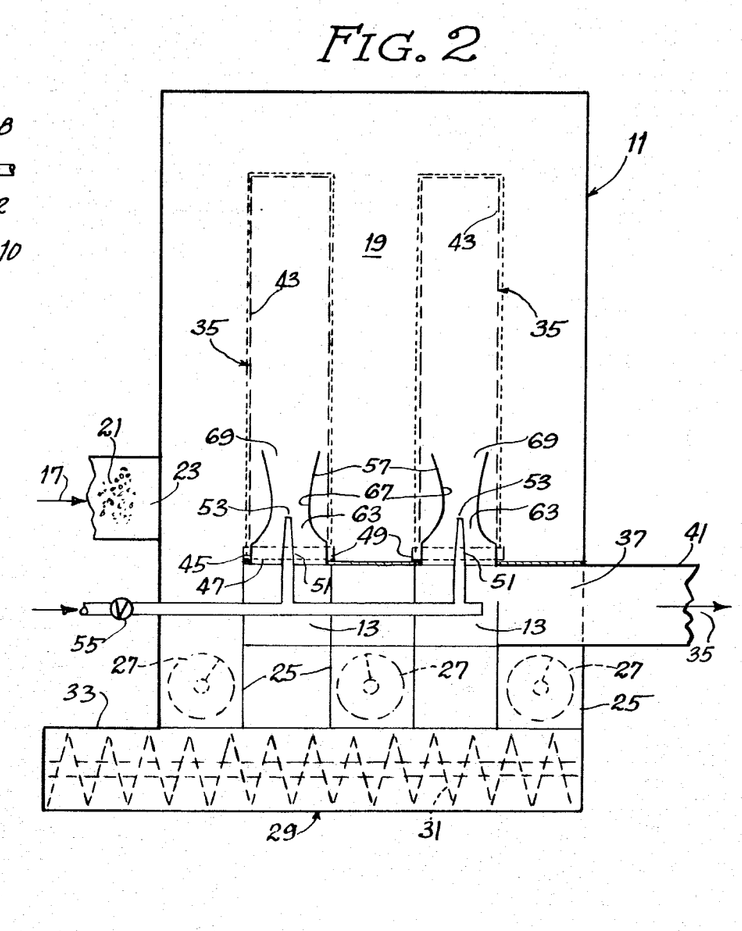
FIG. 2 is a schematic sectional elevational view and plan view of a filtering apparatus of the type shown in FIG. 1 with the open end of the filter element(s) at the bottom.
Figures 3, 5:
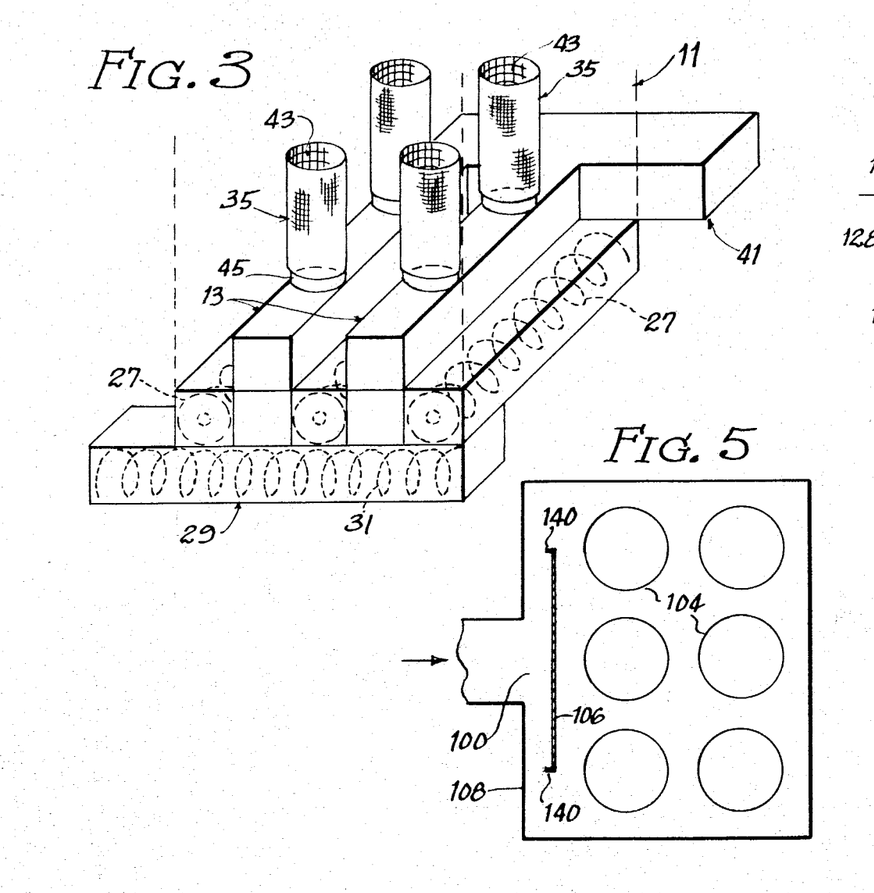
FIG. 3 is a schematic elevational view of a portion of the filter apparatus shown in FIG. 2 with enlarged detail of the construction at the lower end portion of the filter tube section.
FIG. 5 is a side elevational view of one modification of filter section shown in FIG. 4.

As illustrated in FIGS. 2 and 3, an alternate filter apparatus comprises an enclosed filter housing 11 subdivided by a horizontally disposed clean gas filter element plenum 13 from the dirty gas plenum chamber 19 into which the gaseous material 17 to be processed for removal of suspended solids 21 is introduced through an inlet opening 23 in communication with the dirty gas plenum chamber 19.

The lower end portion of the dirty plenum chamber is formed with a series of screw conveyor troughs 25 with cross screw conveyors 27 to collect the solid particles which fall gravitationally when removed from the filter element surfaces. Another screw conveyor 31 operates in the trough 29 to provide an air tight plug seal at extension 33 for displacement of collected solids from the apparatus.

An outlet opening 37 communicates with the clean gas filter element plenums 13 with the exhaust 35 of clean gas into the atmosphere or the exhaust of clean gas as a process or reprocessing gas from duct 41.

Suspended into the dirty gas plenum chamber 19 are one or more vertically disposed filter elements 35 in the form of elongate porous members, such as stockings preferably formed of felted fabrics of fibers of the type previously described. The tubular filter member is closed at its upper end and is usually retained in its tubular shape by means of a suitable internal support, such as an open tubular frame 43 formed of wire screening or the like rigid, highly foraminous material.

Each filter element is removably attached to the horizontally disposed clean gas filter element plenums 13 by a tubular section 45 at opening 47. The tubular member is dimensioned to receive the lower open end portion of the filter tube 35 in telescoping relationship thereabout and it is secured in the assembled relation about the tubular section 45 as by means of a clamp 49.

Extending upwardly into the opening beyond the lower end of the filter tube is a source of primary gas in the form of a nozzle 51 with orifice 53 having diameters, such as one-eighth inch to 1 inch, and connected at its lower end to a source of supply of high pressure gas with suitable valve means 55 and controls for regulating the frequency and duration of burst of the high pressure primary gas to the nozzle 51.

Concentrically arranged about the nozzle 51 is a nozzle or venturi section 57 to provide an annular space 63 between the nozzle 51 and the nozzle or venturi section 57 which is open at its lower end for the flow therethrough of secondary gas.

The nozzle or venturi section 57 is provided at its end with a section axially aligned with the nozzle 51 but with the passage through the throat 67 being of larger dimension than the orifice 53 and spaced therefrom by an amount to enable the spreading cone of the jet of primary gas from the orifice 53 to flow in close proximity to the interior wall of the nozzle or venturi throat at 67 to generate a pumping action as the burst of gas issues from the orifice 53 for passage through the aligned nozzle or venturi section. Thus the secondary gas is drawn through the annular space 63 for addition to the primary gas passing through the throat 67 to generate a burst of gas having greater force and effect for issuance from the end 69 of the nozzle or venturi section.

The effect is a burst of high pressure gas which overpowers the normal flow of filter gas to effect counterflow through the interior of the filter tube without discontinued introduction of gas to be filtered into the system. The sudden burst of overpowering gas generated by the venturi arrangement for flow in a direction opposite to normal filter flow causes the filter tube to be distended by a whipping action which travels lengthwise along the filter tube to dislodge filter solids collected as a filter cake on the ingoing side of the tube.

Both modifications provide such accentuation of the gas burst, even with a substantial decrease in the length of burst, as to enable considerable savings in the amount of high pressure gas employed while decreasing the amount of time taken up by the cleaning cycle. The increase in the force of burst whereby the removal of solids from the pores of the filter tube or filter surface is more complete enables operation with lower pressure drop and corresponding decrease in filter drag, all of which adds up to a more efficient and effective operation of filtration.

The pressure of the primary gas should be higher than atmospheric pressure, such as within the range of 20-200 p.s.i. and preferably within the range of 50-125 p.s.i., with a time of burst measurable in milliseconds, such as from 5 to 250 milliseconds, and preferably 15 to 100 milliseconds. Such bursts can be arranged for occurence at timed sequences such as every one-half to 5 minutes and preferably about every 1 to 2 minutes, depending somewhat upon the type of filter cake that is formed and the materials to be filtered out.

Because of the augmentations of the burst of gas issuing from the nozzles or venturis, in accordance with the practice of this invention, the duration of burst of high pressure gas can be greatly decreased and the amount of high pressure air required to generate the gas burst can also be materially reduced. Such reduction in duration of burst and in the amount of high pressure gas required to effect satisfactory cleaning contributes importantly to the decreased cost and expense in the operation of the filter device embodying the features of this invention.

Further, the increased force of the burst provides for more effective removal of the filter cake from the walls of the filter tubes with the result that the filter device of this invention does operate at lower pressure drop across the filter medium for removal of equivalent amounts of material, thereby to provide a further important contribution to the savings in cost of dust and dirt removal.

In a typcial operation, air at 75 p.s.i. was used as primary air for feeding an orifice of 0.339 inch diameter with a pulse duration of 20-45 milliseconds. Each of three rows of bags was pulsed every minute.

It has been found that when use is made of a technique of the type described for removal of solids collected as a filter cake on the filter surface, without the need to discontinue filter flow during filter cake removal, some of the solids of the removed filter cake tends to become re-entrained in the gaseous stream introduced into the inlet plenum chamber, as the removed solids fall downwardly gravitationally to the collector for removal. This, of course, increases the burden on the separation unit and markedly reduces the operating efficienty thereof.

In addition, it tends to accentuate the amount of solids required to be filtered out by reason of the need to effect removal of solids which have previously been separated. This deficiency is characteristic of all gaseous filtration systems wherein the gas to be filtered is introduced adjacent the underside of the filter surface for flow upwardly in a direction counter-current to gravitational flow of the removed solids and wherein the introduction of gas to be filtered is maintained during the removal of filtered solids such that the latter tend to become re-entrained or re-suspended in the upwardly flowing stream of gas.

It has been found, in accordance with an important concept of this invention, that considerable improvement in efficiency is achieved when means are employed in the inlet plenum chamber for spreading the gaseous stream to be filtered for distribution over a wide area of the inlet plenum chamber and preferably in an area aligned with the upper portions of the filter tubes or bags.

Under such circumstances, the gaseous medium introduced flows through the inlet plenum chamber to the filter bags at a rate less likely to cause re-entrainment of the separated solids. More importantly, the general direction of flow of the gaseous medium will be in the lateral or downward direction during a major portion of contact with the separated solids thereby to assist the particles in their downward movement towards the collecting chamber for removal from the system.

The use of baffles to engage the gaseous stream upon introduction into the inlet plenum chamber brings about a rapid change in direction as the gaseous stream clears the edges of the baffles. This introduces a centripetal force which not only tends to throw out solid particles, especially particles of higher specific gravity, from the gaseous stream introduced, but it also tends to cause uniform distribution of the particles remaining suspended in the gaseous stream to enable fuller utilization to be made of the available filter surface.

The described concept is capable of a number of ramifications, some of which will hereinafter be described in greater detail. It will be understood that the concept of baffled introduction of the gaseous stream to be filtered into an upper portion of the inlet plenum chamber has beneficial effect not only in the single venturi system previously described but also in multiple venturi systems for accelerating the speed and increasing the force of burst, as described in copending application Ser. No. 833,531, filed June 16, 1969, entitled "Apparatus for Filtering Suspended Solids from Gaseous Medium and for Removal of Filter Cake from Filter Elements".

In general, the invention has application to dust collectors which make use of filter surfaces for removal of solid particles from the gaseous stream passing therethrough and wherein displacement of the collected solid particles is effected for removal from the system without terminating the introduction of gas to be filtered. Such displacement may be effected by the principle disclosed or by forcing clean gas to flow in the direction opposite to normal flow to loosen the filter cake, such as described in U.S. Pat. Nos. 3,204,390, 3,429,106, 3,436,899 and 3,436,898.

Having set forth the basic concepts of this invention, illustration will now be made by reference to the various ramifications shown in the accompanying drawings.

Figure 4:
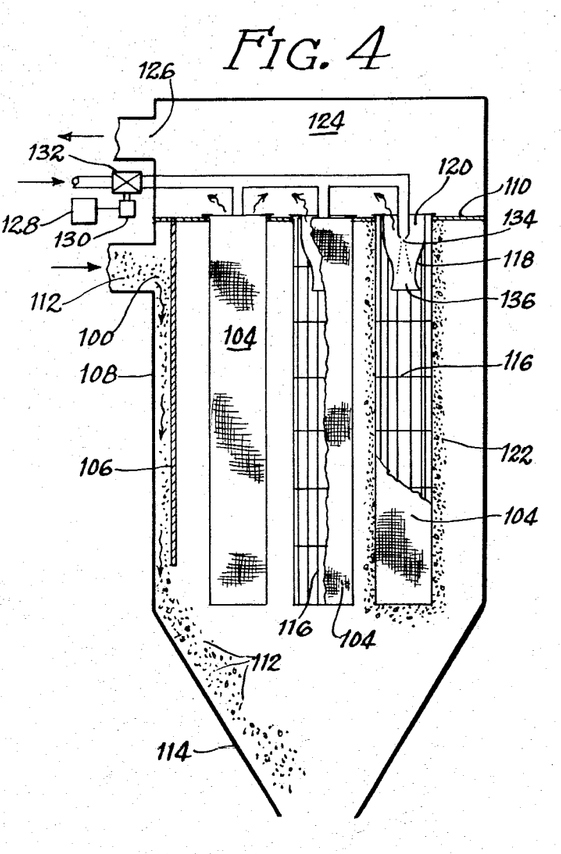
FIG. 4 is a schematic front elevational view of a filter device of the type described illustrating another feature of this invention.

In FIGS. 4 and 5, illustration is made of a filter system of the type which makes use of a single venturi, as previously described. The construction is the same as that previously described except that the inlet 100 to the inlet plenum chamber 102 is located in the upper portion of the inlet plenum chamber in crosswise alignment with the upper end portion of the suspended filter tubes 104. A vertically disposed baffle plate 106 is mounted within the inlet plenum chamber in substantially parallel relation with the chamber wall 108 with a spaced relationship therebetween and with the upper edge of the plate preferably, but not necessarily, abutting against the bottom side of the cell plate 110. The baffle plate 106 confronts the inlet opening 100 and extends both downwardly and laterally beyond the opening so that the gaseous stream introduced through the opening will strike the baffle plate. The baffle plate will spread the inflowing gaseous medium downwardly and laterally, as indicated by the arrows in FIGS. 4 and 5, for passage about the free edges of the plate into the bag section of the inlet plenum chamber 102.

A resultant effect of the rapid change in direction, by reason of the presence of the baffle, will be some mechanical separation of solid particles from the gaseous medium. The particles which remain suspended in the gaseous medium will become uniformly distributed throughout the gaseous stream. The particles 112 separated mechanically from the gaseous stream will fall downwardly into the hopper 114 below the filter tubes or bags 104. The particles remaining suspended in the gaseous stream will flow with the gaseous stream to the filter tubes or bags 104.

As previously described, the flexible bags of fabric material are supported in open position about suitable foraminous cages 116 and the bags and cages are connected to a venturi tube 118 joined at its upper end to the cell plate 110 about the outlet opening 120.

In normal filter flow, the gaseous medium passes from the inlet plenum chamber, through the filter bags 104 whereby solid particles are separated to form a filter cake 122 on the ingoing side of the filter bag or tube, while clean air passing through the filter fabric is exhausted through the opening 120 and into the clean air plenum chamber 124 from which it is exhausted through the outlet 126.

Removal of solids collected on the ingoing side of the filter tubes is effected in response to an electrical signal sent by timer 128 to the solenoid valve 130 which opens the diaphragm valve 132. The valve remains open for only a short period of time, as previously described, to release a short burst of high pressure gas from the primary nozzle 134 to induce an increase in the force of the gaseous burst issuing from the secondary nozzle 136. The combined volume of primary and secondary gas flows into and through the interior of the filter tube.

The gaseous burst, at a pressure higher than that of the dirty air, operates to halt the inflow of air through the filter and the pressure of the burst expands the filter tube as it travels lengthwise through the tube. Such flexure occurs so rapidly as to whip collected solids from the ingoing side of the filter tube. The separated solids fall from the filter tube to the hopper 114 below. When the energy created by the burst of high pressure air is spent, the filter tube returns to normal operation.

In the modification shown in FIGS. 4 and 5, the gaseous medium to be filtered, hereinafter referred to as dust-laden air, enters the collector through the inlet opening 100 and strikes the baffle plate 106. The baffle prevents the dust-laden air from being blown directly onto any one of the filter tubes. Instead it operates to disperse the dust uniformly within the collector. The baffle eliminates high upward velocities of air flow from the region adjacent the bottom ends of the filter tubes thereby to minimize entrainment of separated solids. High downward or outward velocity of the dust-laden air is confined to the region between the wall of the collector and the baffle — out of contact with the filter tubes.

By the time that the dust-laden air reaches the filter tubes, the velocities are greatly reduced, especially in the vertical direction.

Tests were carried out with a collector of the type illustrated in FIG. 1 but with two different types of inlet air entrances, one being the lower inlet illustrated in FIG. 1 and the other being the baffle type upper inlet embodying the further concept of this invention. In both sets of tests, all variables except the type of entrance were identical and the same dust and air volumes were used.

Figure 10:
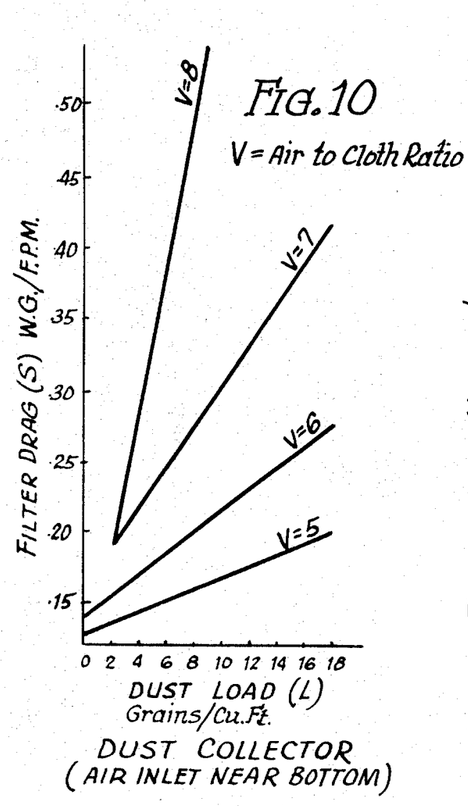
FIGS. 10, 11 and 12 are curves drawn from data developed in the examples.

The results of the tests on the collector with the bottom entrance are shown in FIG. 10 where filter drag (S) is plotted vs. dust load (L) at several values of constant air to cloth ratio (V). The collector is very sensitive to both dust load increases and air to cloth ratio increases. In addition to this extreme sensitivity, the collector would not operate satisfactorily at an air to cloth ratio of 9:1.

Figure 11:
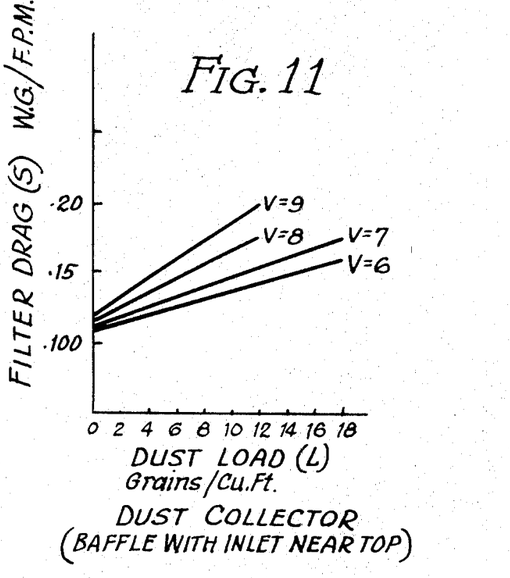

The results of the identical tests on the collector with the baffled top entrance are shown in FIG. 11. Comparing lines of constant air to cloth ratio for the two collectors shows that the collector with on baffled top entrance has a considerably lower operating filter drag. It should also be noticed that the collector is also less sensitive to increases in both dust load and air to cloth ratio.

Figure 12:
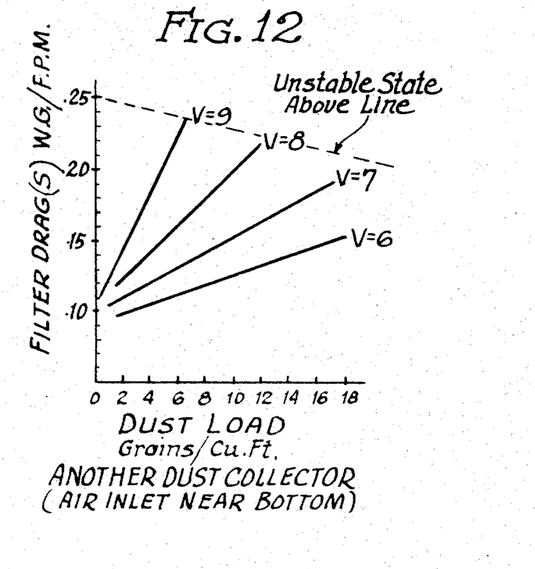

The type of entrance recommended for this type of collector not only results in a generally lower filter drag, but also improves the influence of the air to cloth ratio (V) and the grain loading (L) on the filter drag (S). From tests carried out on another pulse jet type collector with a bottom entrance, the relationship was found to be;

$$S = K e^{(-2.45 + 0.6V)} L + \text{constant} \quad 1a$$

and for conditions where $S \geq 0.225$, the collector would not operate at steady state. This relationship was obtained by curve fitting data obtained for this particular collector. The plot of this data is shown in FIG. 12.

Using the same dust and the same procedure, data was also obtained for the baffled top entrance version of the same collector. The relationship was found to be of the form $$S = K V^2 L + \text{constant} \quad 2a$$

where 1/K is equal to the effective dust permeability. The plot of this data is shown in FIG. 11.

The better of these two relationships is the one for the baffled top entrance collector. This can be seen by a direct comparison of the two figures. For instance, at an air to cloth ratio of 6:1, the performance curves are almost identical. However, as the air to cloth ratio is increased, the resultant increase in filter drag is much more pronounced for the bottom entrance collector. As a result, at 8:1 the bottom entrance collector has an appreciably higher filter drag at all values of grain loading. At higher values of V, the difference is even greater. In addition to this, the bottom entrance collector will not operate at a steady state condition when the filter drag exceeds values of about 0.225–0.25. The reason for this is the extensive re-entrainment of dust as it falls from the bags as they are cleaned.

If one compares the two mathematical expressions, the same general conclusions are reached. If the two equations are partitioned as equations 1b and 2b below and the terms within the brackets compared, it is seen that one is an exponentially increasing term while the other is a quadralically increasing term.

$$S = K [e^{(2.45 + 0.6V)}] L + \text{constant} \quad 1b$$

$$S = K [V^2] L + \text{constant} \quad 2b$$

This means that as the air to cloth ratio (V) increases, the slope of the filter drag (S) versus grain loading (L) curve increases much more drastically for the bottom entrance collector than for the baffled top entrance. For a collector of this type, the lowest possible slope is preferred.

Nomenclature

A — Cloth area sq. ft.
Q — Volumetric air flow rate ft. 3/min.
V — Air to cloth ratio equals Q/A ft./min.
$\Delta Pc$ — Pressure drop across the collector just before cleaning in W.G., refer to the accompanying drawing.
S — Filter drag, obtained by dividing the pressure drop across the collector by the air to cloth ratio $\Delta Pc/V$ in W.G./ft./min.
L — Dust load    grains/Ft.$^3$
$K^{-1}$ — Dust permeability (grains/ft.$^2$/in WG./FPM) $K^{-1}=(1/K)$
$e - \cong 2.72$ FIG. 5 illustrates a modification wherein the edge portions of the baffle 106 are turned outwardly towards the collector wall 108 to provide flanges 140 about which the dust-laden air is required to flow to enhance mechanical separation of dust particles and more uniformly to distribute the dust that remains suspended in the air.

Figure 6:
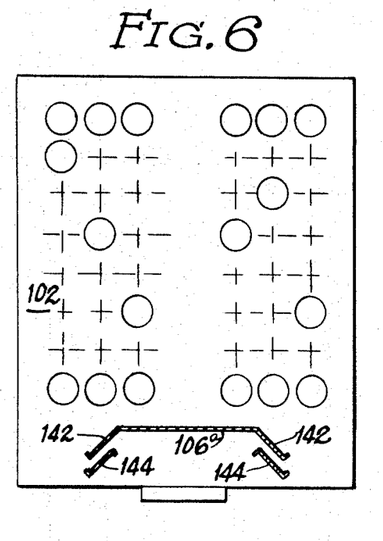
FIG. 6 is a side elevational view of another modification of filter section shown in FIG. 4.

In the modification shown in FIG. 6, the baffle comprises a single baffle plate 106 with outwardly inclined edge portions 142 and parallel plates 144 spaced outwardly from the tapered portions to define vaned sections therebetween through which the dust-laden air must travel for passage about the baffle plates into the inlet plenum chamber 102.

Figure 7:
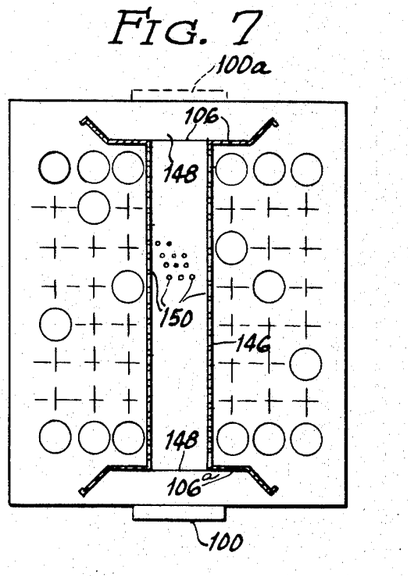
FIG. 7 is a side elevational view of a still further modification.

FIG. 7 shows a collector with inlet openings 100 and 100$^a$ aligned in opposite walls with baffle plates 106 for each opening. In FIG. 7, a tubular section 146 extends crosswise through the bag area in the inlet plenum chamber in communication with aligned openings 148 through the baffle plates. Dust-laden air introduced through the inlet openings is divided with one portion spreading out over the baffle plate for distribution into the inlet plenum chamber while other portions enter the crosswise extending tubular member. The tubular member 146 is formed with openings 150 communicating the interior of the tubular member with the inlet plenum chamber for flow of dust-laden air from the tubular member amongst the filter bags in the bag house.

Figure 8:
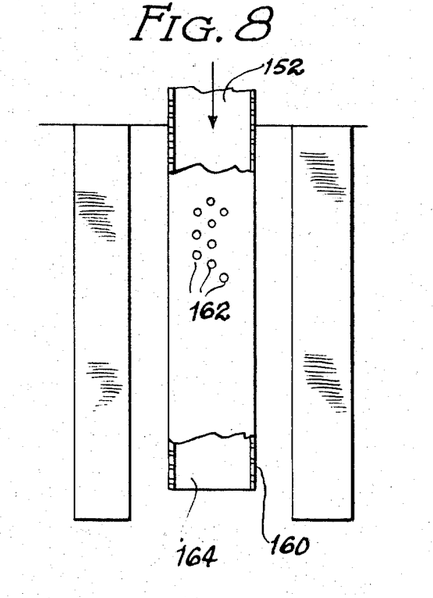
FIG. 8 is a front elevational view of a further concept for the introduction into the filter section of the gas to be filtered.

FIG. 8 shows a modification wherein the inlet 152 for the dust-laden air is located at the top of the bag house for the introduction of dust-laden air into the inlet plenum chamber 102 through an opening in the top wall. Distribution is achieved by a baffle in the form of an elongate tubular member 160 which extends downwardly from the inlet opening into the inlet plenum chamber with openings 162 in the walls of the tubular member for distribution of the dust-laden air into the bag house by horizontal flow through the openings. In this modification, it is desirable to make use of a tubular baffle member which is open at its bottom end 164 to enable separated solids to fall downwardly into the hopper.

Figure 9:
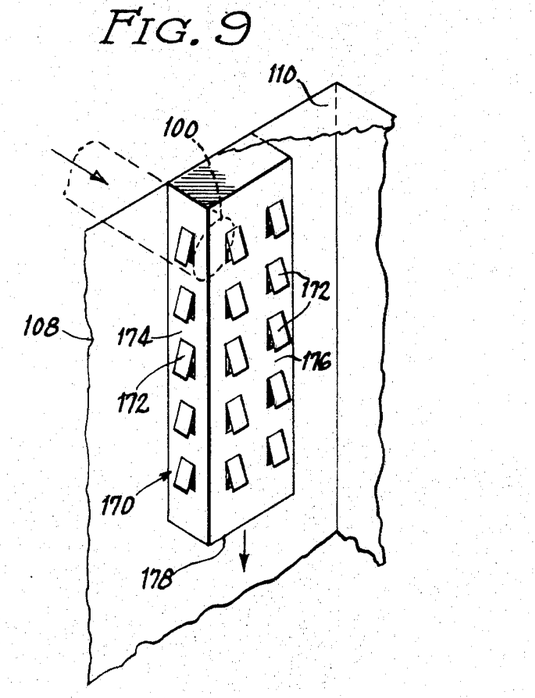
FIG. 9 is a perspective front elevational view of a still further modification for introduction of the gas to be filtered.

FIG. 9 shows a collector in which the baffle is in the form of an enclosure 170 which forms a housing or chamber with the collector wall 108 and into which the stream of dust-laden air is introduced. The enclosure is formed with a plurality of openings 172 in the side walls 174 and back wall 176 and with an open bottom wall 178 for the passage of dust-laden air therethrough into the inlet plenum chamber.

Similarly, the baffle plates of FIGS. 4, 5 and 6 may be formed with perforations to allow some of the dust-laden air to pass directly therethrough into the inlet plenum chamber without the need to pass about the edges of the plate, as previously described.

It will be apparent from the foregoing that we have provided a new and improved collector for the separation of solids from gaseous medium and in which the collector operates in a more efficient manner with continuous inflow of gas to be filtered thereby to provide a new and improved gas filtration system.

It will be understood that changes may be made in the details of construction, arrangement and operation without departing from the spirit of the invention, especially as defined in the following claims.

We claim:

1. In a collector for filtering out solids suspended in a gaseous medium including a housing having an inlet opening through which the gas to be filtered is introduced into the collector and an outlet for the removal of filtered gas, an inlet plenum chamber in said housing in communication with said opening for the introduction of gas to be cleaned into the inlet plenum chamber, a hopper at the base of said inlet plenum chamber for receiving removed solids, a plurality of filter tubes mounted to extend vertically in said inlet plenum chamber providing a filter surface on which solids are separated out from the gaseous medium passing therethrough, and a clean gas plenum chamber in communication with the upper open ends of the filter tubes and with the outlet, the improvement which comprises means for effecting displacement of solids collected on the surface of the filter tubes without stopping, the introduction of gas to be filtered including a nozzle extending into the interior of each filter tube and means communicating each nozzle with a source of high pressure gas, a venturi mounted in surrounding spaced relation and in axial alignment with each nozzle whereby secondary gas is drawn into the venturi in response to the burst of pressurized gas from the nozzle to add to the stream of gas issuing from the venturi into the interior of the filter tube to cause displacement of collected solids from the filter surface, the inlet opening being located at a level in crosswise alignment with an upper portion of the filter tubes, and baffle means comprising a wall extending from above the inlet opening downwardly to beyond the inlet opening through the major length of the filter tube with the lateral edges spaced from the walls of the housing and mounted between the inlet and the filter tubes in closely spaced parallel relation with the wall of the housing adjacent the inlet whereby gas flow through the inlet is interrupted by the baffle to prevent direct flow into contact with the filter tubes and divert the gas for flow about the lateral and bottom edges of the baffle into the inlet plenum chamber for substantially uniform distribution and flow about the bags substantially throughout their lengths with the flow being generally in the downward direction through the filter portion of the housing.

2. A collector as claimed in claim 1 in which the baffle comprises a vertically disposed plate spaced inwardly a short distance from the inlet and in which the baffle plate is formed with a plurality of openings extending therethrough.

3. A collector as claimed in claim 1 in which the baffle comprises a vertically disposed plate spaced a short distance inwardly from the inlet and flanges extending outwardly from the edges of the baffle plate.

4. A collector as claimed in claim 3 in which the flanges extend at an angle from the baffle plate.

5. A collector as claimed in claim 4 which includes additional vaned members spaced from and in substantially parallel relation with the angled flanges to provide vaned sections through which the gaseous stream flows about the baffle plate into the inlet plenum chamber.

* * * * *